United States Patent [19]
Gilmore

[11] Patent Number: 4,481,715
[45] Date of Patent: Nov. 13, 1984

[54] MEASURING WHEEL

[76] Inventor: David L. Gilmore, 219 Sycamore, Highlands, Tex. 77562

[21] Appl. No.: 463,742

[22] Filed: Feb. 4, 1983

[51] Int. Cl.³ .......................... G01B 3/12; G01B 7/04
[52] U.S. Cl. .................................. 33/141 B; 72/201; 33/141 E
[58] Field of Search ............ 33/134 R, 134 A, 125 M, 33/141 R, 141 B, 129, 132, 133, 141.5, 142; 72/201, 10, 364, 342

[56] References Cited

U.S. PATENT DOCUMENTS

| 1,850,878 | 3/1932 | Hunt .................................. 72/201 X |
| 2,761,986 | 9/1956 | Wald et al. .................... 33/134 R X |
| 3,103,072 | 9/1963 | Golley et al. . |
| 3,394,568 | 7/1968 | Calmes . |
| 3,604,237 | 9/1971 | Kawanami et al. . |
| 3,763,679 | 10/1973 | Lane et al. . |
| 3,880,358 | 4/1975 | Schaming . |
| 4,050,160 | 9/1977 | Schmitt . |

FOREIGN PATENT DOCUMENTS 2315865 10/1974 Fed. Rep. of Germany .
1403878 8/1975 United Kingdom .

Primary Examiner—Harry N. Haroian
Attorney, Agent, or Firm—William F. Riesmery, III

[57] ABSTRACT

A wheel apparatus is provided for measuring by rolling contact a dimension of an elevated temperature surface. The device is particularly useful for measuring the length of product in a continuous casting machine. The apparatus includes an elongated arm having an internally cooled wheel rotatably mounted at one end thereof. The arm is pivotally movable about a mount at an end of the arm opposite from the one on which the wheel is mounted. The mount biases the arm to a position in which the longitudinal axis of the arm is normal to the adjacent surface of the cast product. The biased mount permits pivotal deflection of the arm upon contact of the wheel by cast product moving in either a forward or reverse direction. The arm has at least one longitudinal cooling fluid passage which only registers with a cooling fluid supply passage in the arm mount when the arm is in the deflected positions thereof. Generally, air is supplied through the mount to cool the arm and outer surface of the wheel. Water is usually supplied separately for internal cooling of the wheel.

8 Claims, 4 Drawing Figures

MEASURING WHEEL

BACKGROUND OF THE INVENTION

The present invention relates to wheels for measuring by rolling contact a dimension of an elevated temperature surface, and particularly to wheels for measuring the length of product in continuous casting machines.

Conventionally, wheels for measuring cast slabs have been mounted either on a trolley movable up and down on vertical rails or a pivotable arm rotated by a cylinder. The wheels in such devices are subject to damage due to operator error, for example, if left in lowered position in the path of a moving slab. This occurs more frequently where a cut slab is moved in reverse direction for the purpose of making additional cuts. An even more prevalent problem is that of water leakage from the internally cooled wheel. An apt discussion of this problem is contained in British Pat. No. 1,403,878, assigned to Gasetechnik Lotz, K. G., the specification of which is incorporated herein by reference. An example of one attempt to solve the leakage problem is shown in U.S. Pat. No. 4,050,160, Schmitt. The apparent disadvantage of the Schmitt design is that water constantly flows out of the wheel onto the surrounding area.

It is therefore a primary object of the present invention to provide improved cooling and eliminate leakage from a wheel for measuring by rolling contact a dimension of an elevated temperature surface.

It is a further object to eliminate damage to the wheel due to impact by the product to be measured.

SUMMARY OF THE INVENTION

According to the present invention an internally cooled measuring wheel is rotatably mounted at one end of an elongated arm. An opposite end of the arm is pivotally mounted on a mounting means so as to be rotatable about an axis parallel to the axis of the wheel. Means is provided for pivoting the arm from a first position in which the wheel does not make contact with a workpiece to a second position in which the wheel does make contact. Desirably the arm mounting means includes means for biasing the arm to a pivoted position in which the wheel is in the path of a moving workpiece. The workpiece may move, for example, back and forth on a roll conveyer. The biasing means preferably permits pivotal movement of the arm in either of two opposite directions when contacted and deflected by the workpiece, depending on whether the workpiece is moving in a forward or reverse direction on the conveyer. It is also preferable to mount the wheel so that it makes contact with a narrow side of the workpiece. This reduces the amount of heat to which the entire device is exposed. In this case the device may be mounted on tracks so as to be movable in and out for accommodating various width workpieces. In another aspect the arm has at least one longitudinal cooling fluid passage therein and the arm mounting means has a cooling fluid supply passage communicating and registering with the cooling fluid passage of the arm only when the arm is deflected from its normal position by contact of the wheel with the workpiece. Preferably, openings are also provided at spaced locations in the arm for directing fluid from the cooling passage therein toward the outer surface of the wheel. Thus, flow of air or other cooling fluid through the arm serves to cool the arm and also the outer surface of the wheel. The cooling gas may be refrigerated to improve heat removal. Since the gas will only flow during measurement, excessive use of cooling fluid is avoided. It will be apparent that cooling fluid for both the interior of the wheel and the arm may be supplied by the mounting means of this invention. This may be accomplished through either the same or separate supply passages in the arm mount. However, cooling fluid for the interior of the wheel is usually supplied separately, i.e. through the wheel mounting and not the arm or its pivotal mount.

DESCRIPTION OF THE PREFERRED EMBODIMENT

Figure 1:
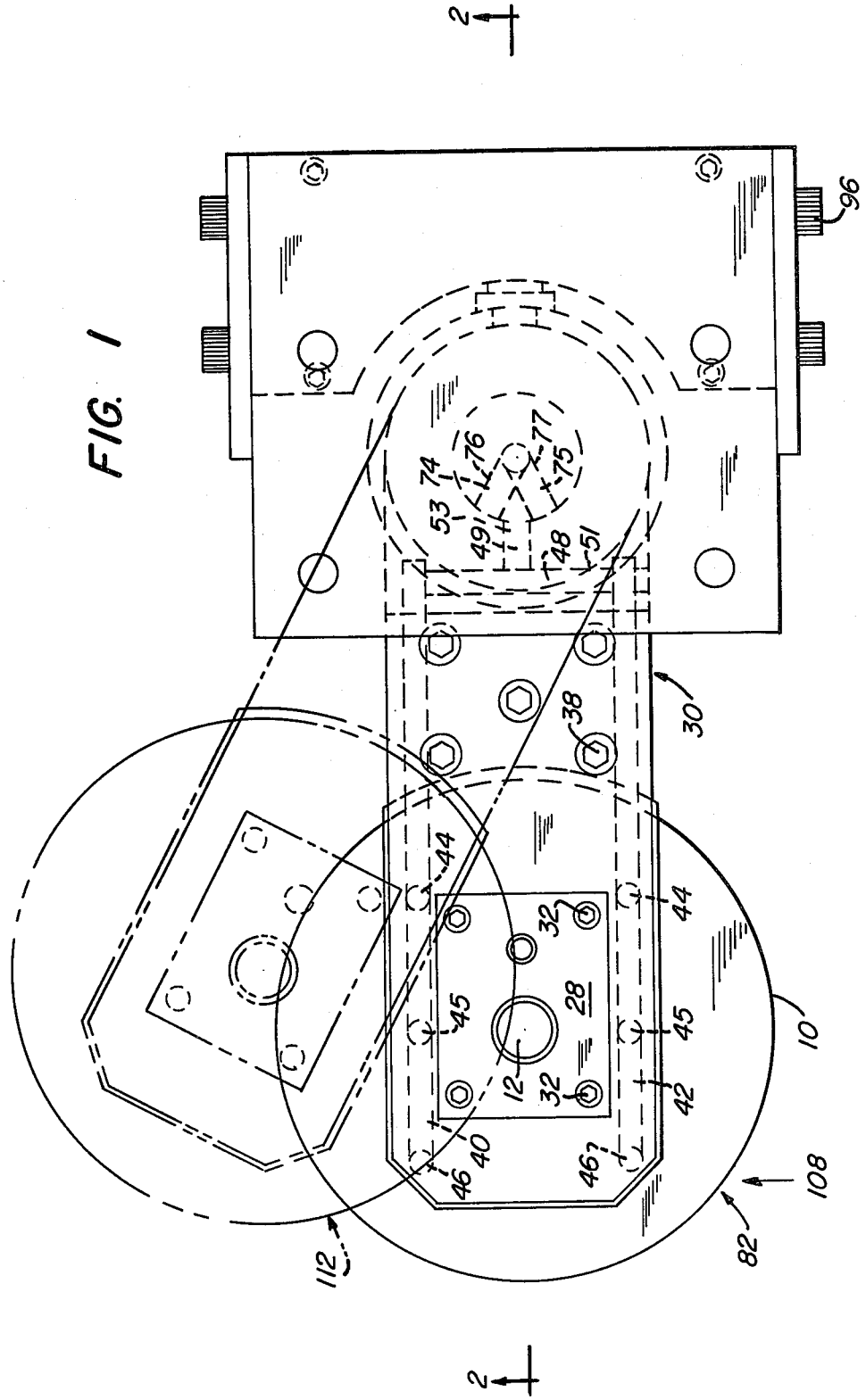
FIG. 1 is a plan view of the apparatus of the present invention.
Figure 2:
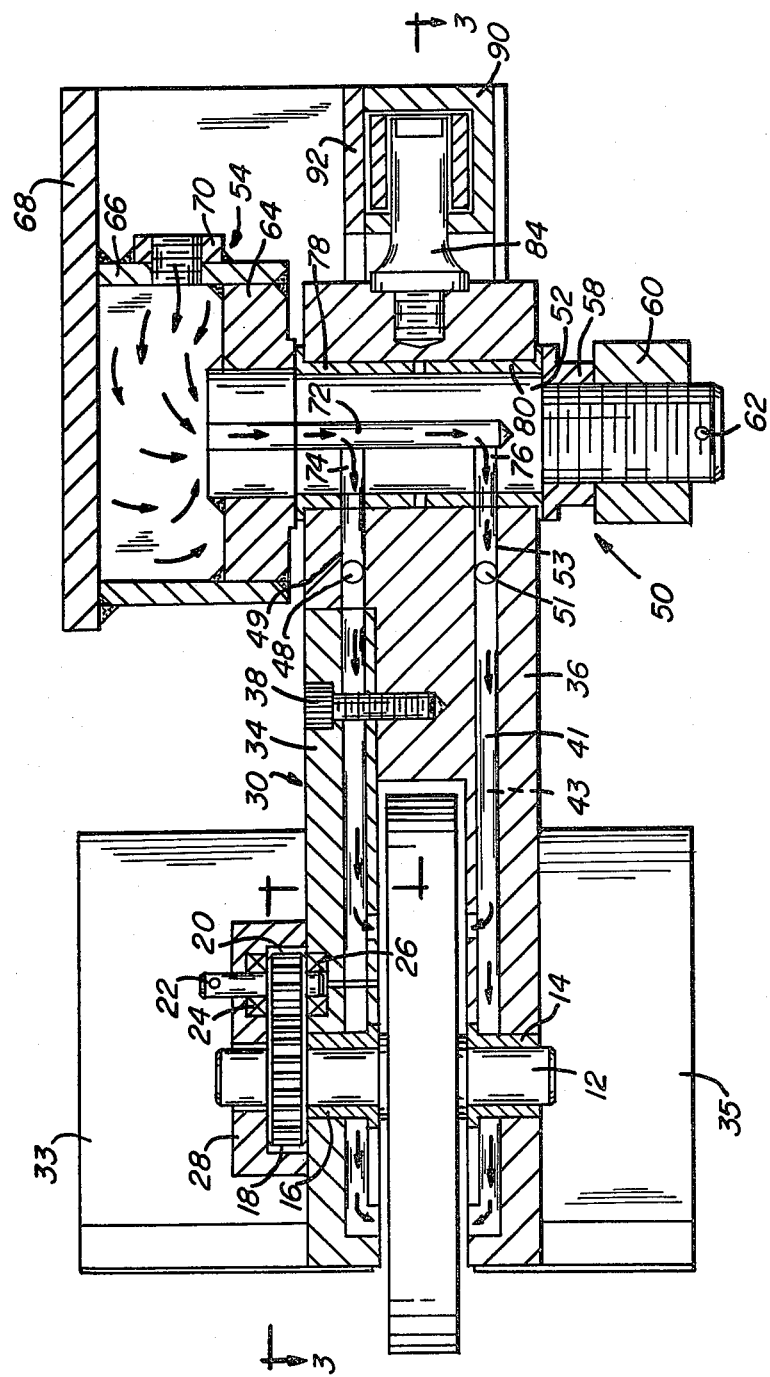
FIG. 2 is a section taken at II—II of FIG. 1.

Although not limited thereto, the apparatus of the present invention is particularly suited to measurement of the length of product in continuous casting machines. The following description is of a device designed for such use. Referring now t FIG. 1, the apparatus includes a measuring wheel 10 having either a separate or integral shaft 12 mounted in bushings 14, 16 (FIG. 2). Inlet and outlet fittings (not shown) are provided in conventional fashion at opposite ends of shaft 12 for cooling water. The water flows through the hollow wheel to cool and prevent thermal expansion of the wheel which could affect the measurement reading. Referring to FIG. 2, gear 18 is keyed to shaft 12 and drives gear 20 mounted on output shaft 22. Shaft 22 is rotatably mounted in bearings 24, 26 which are press fit into cover plate 28 and arm 30, respectively. Cover plate 28 is secured to arm 30 by cap screws 32 (FIG. 1). Flexible shafting (not shown) connected to output shaft 22 extends to an indicator in or near an operator's pulpit to provide a measure of the length of the cast workpiece. Heat shield plates 33, 35 are attached to opposite sides of arm 30.

Arm 30 is composed of two plate sections 34, 36 attached by a plurality of cap screws 38 (FIGS. 1 and 2). The arm has four longitudinal cooling fluid passages, two upper passages 40, 42 (FIG. 1) and two lower passages 41, 43 (FIG. 2). Each longitudinal passage has three equally spaced lateral passages, 44, 45, and 46 shown in FIG. 1. The lateral passages direct air toward the outer surface of the wheel. The longitudinal passages are joined by connecting passage 48 (FIG. 1) which in turn communicates with passage 49 (FIG. 1). Similarly, the lower two longitudinal passages are joined by connecting passage 51 which in turn communicates with passage 53. Passages 49 and 53 are designed to communicate with corresponding axially spaced radial passages 74, 75 and 76, 77 in shaft 52 when the pivot arm is rotated to opposite angular positions as hereinafter described.

Figure 3:
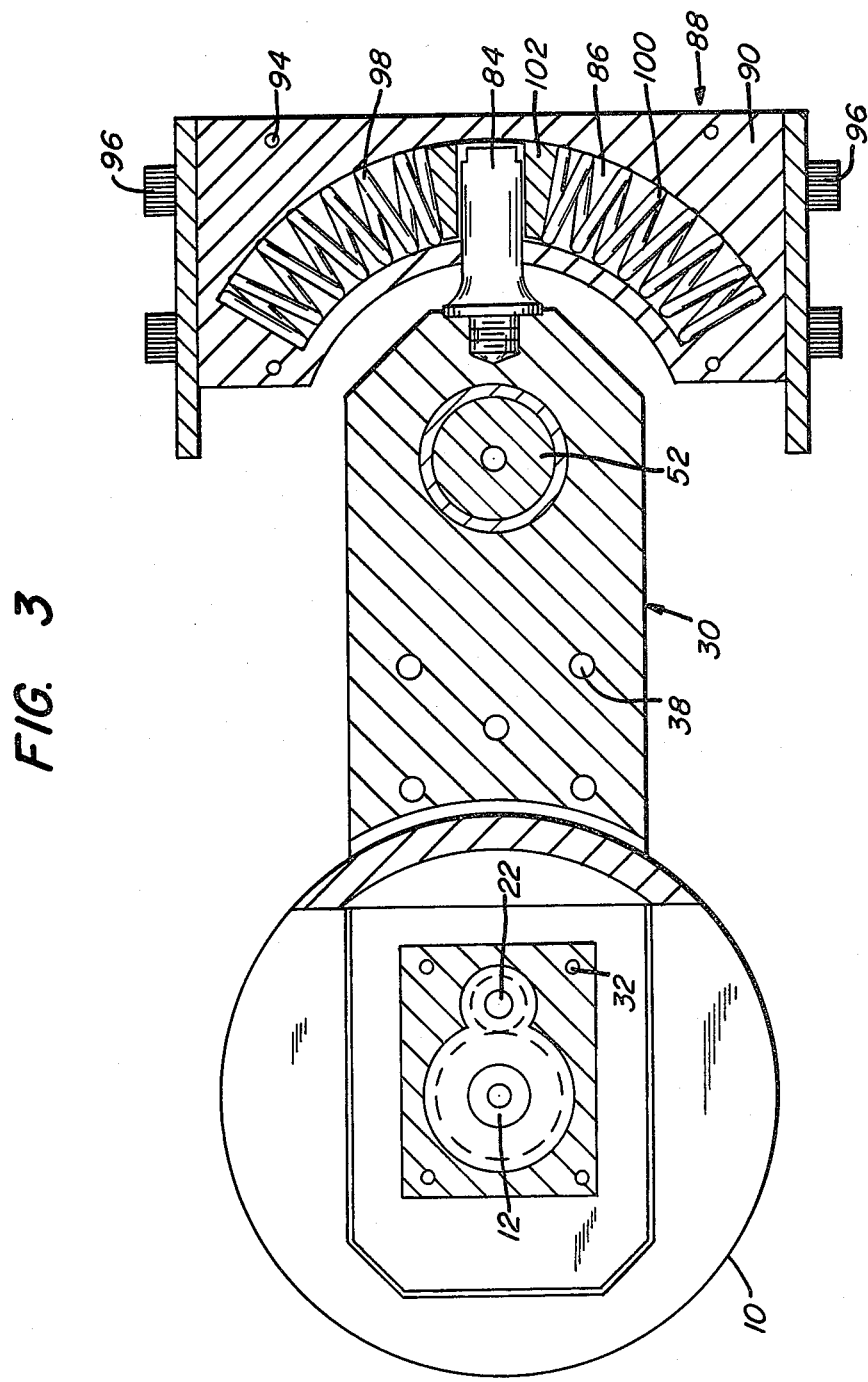
FIG. 3 is a section taken at III—III of FIG. 2.

The arm is pivotally mounted on a mount assembly 50 (FIG. 2). The mount assembly includes shaft 52 one end of which is secured to fluid manifold 54. The other end of shaft 52 is threaded and receives thrust nut 58, lock nut 60 and a cotter pin (not shown) in hole 62 for fastening the arm on the shaft. Fluid manifold 54 includes a ring-shaped plate 64 which is welded to cylindrical pipe section 66. The pipe section in turn is welded to top mount plate 68. The top mount plate is bolted to an adjustable bracket on the torch carriage of the continuous casting machine. In our application thereof slabs being cast does not change appreciably so that movement in and out in a direction normal to the slab is not required. But in some shops it may be advantageous to mount the wheel on a trolley riding on a set of rails on the torch carriage of the casting machine. These rails would extend in a direction normal to the passline of the machine so that the measuring device could be moved inwardly or outwardly for rough positioning in a horizontal direction adjacent the narrow side edge of various width slabs or billets. The wheel is aligned in a horizontal attitude in the preferred mounting arrangement as distinguished from the usual vertical mount conventionally used. The horizontal alignment of the wheel eliminates the possibility of cooling water leaking onto the slab or billet. The rail mounting suggested above forms no part of the present invention and thus is not shown. The manifold has threaded inlet 70 for receipt of an air supply pipe (not shown). Air flows through the manifold to axial passage 72 in shaft 52. The axial passage communicates with the four radial passages 74, 75, 76 and 77 in the shaft. A pair of bushings 78, 80 slip fit onto shaft 52 have holes matebly aligned with each of the radial passages. The arm mounting assembly includes means for biasing the arm to a normal position 82 (FIG. 1) in which the wheel protrudes into the path of the cast workpiece to be measured. A tension piece 84 threadably mounted in arm 30 extends into segmental circular-shaped cavity 86 in spring housing 88. Housing 88 includes a thick plate section 90 having cavity 86 cut therein and cover plate 92. The two plates are attached by cap screws (not shown) inserted in threaded holes 94 in the plates (FIG. 3). Socket head cap screws 96 are used to secure the spring housing to the side plates of the housing mount. Compression coil springs 98, 100 are mounted on opposite sides of the tension piece in cavity 86. Recoil spacer 102 separates the springs from the tension piece.

In operation, a slab moving in a forward direction 108, (FIG. 1) deflects wheel 10 from its normally biased position 82 to position 112. Pivotal movement of arm 30 to this deflected position causes passages 49, 53 in the arm to register with radial passages 74, and 76 in the arm mount. In the deflected positions, air is able to flow in the arm, cooling the arm and outer surface of the wheel. However, cooling air does not flow when the arm is in normally biased position 82. A slab travelling in a reverse direction opposite to the direction 108 will cause deflection of wheel 10 to an opposite deflected position in which passages 49 and 53 will become aligned and communicate with radial passages 75 and 77. It will be apparent that the relative cross-sectional dimension and shape of the registering portions of the passages may be designed to accommodate various ranges of workpiece size which affect the angle of deflection of the wheel and arm.

Figure 4:
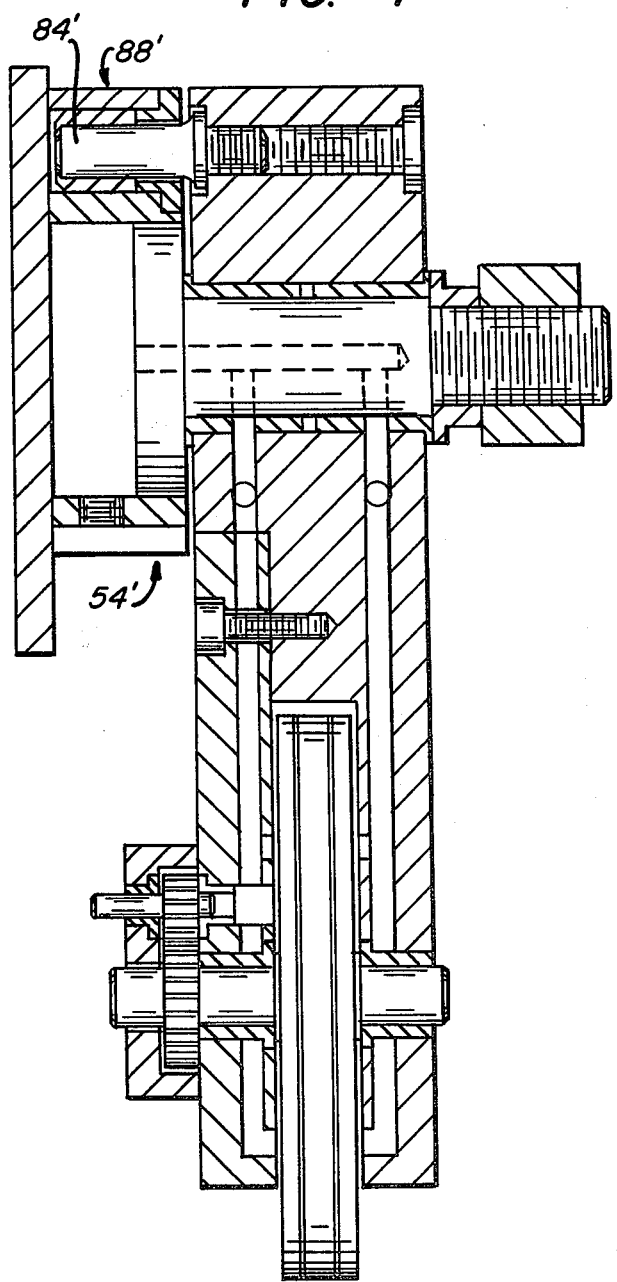
FIG. 4 is a section similar to FIG. 2 of an alternative embodiment of the invention.

FIG. 4 shows an alternative embodiment in which the spring housing 88' is located on the fluid manifold 54'. Housing 88' contains compression coil springs mounted on opposite sides of the tension piece 84', the same as in FIGS. 2 and 3. This configuration permits greater angular movement of the arm about the pivot axis which is desirable for some applications.

I claim:

1. In a wheel apparatus for measuring a dimension of an elevated temperature surface, said apparatus including a wheel for making rolling contact with said surface, means for rotatably mounting said wheel, an elongated arm having said wheel and wheel mounting means mounted adjacent one end of said arm, means pivotally mounting said arm at an end of the arm opposite from the end on which said wheel is mounted, said arm being pivotally movable from a first position in which said wheel does not make contact with the elevated temperature surface to a second position in which said wheel does make rolling contact with said surface, the improvement in which said apparatus further comprises:

said arm and arm mounting means having at least one pair of mateble passages for transport of cooling fluid and for directing said fluid to said wheel for the cooling thereof, said passages registering only when said arm is pivoted to the second position thereof, thus permitting flow of said fluid only when the wheel is in rolling contact with the elevated temperature surface.

2. The apparatus of claim 1 in which at least one of the passages in said arm has an opening facing the exterior of the wheel for directing said fluid against the outer surface of the wheel.

3. The apparatus of claim 1 in which said pivotal arm mounting means further comprises spring means for bracing said arm in said first position, and in which said first position is in the path of travel of said elevated temperature surface.

4. The apparatus of claim 3 in which said arm mounting means has cavity of the shape of a circular segment, said spring means including a pair of compression springs, each spring being mounted in said cavity on an opposite side of a portion of said arm extending within said cavity and movable back and forth therein.

5. A wheel appratus for measuring the length of a cast metal strand in a continuous casting machine, said apparatus comprising:

a wheel for making rolling contact with said metal strand, means pivotally mounting said arm at an end of the arm opposite from the end on which said wheel is mounted, said pivotal mounting means including means for biasing said arm to a first position in which said wheel is in the path of travel of the cast metal strand, said arm and arm mounting means having at least one pair of mateable passages for transport of cooling fluid and for directing cooling fluid to said wheel for the cooling thereof, said passages registering only when said arm is pivoted to a second position in which the wheel makes rolling contact with the cast metal strand, thus permitting flow of said fluid only when the wheel is making rolling contact with said strand.

6. The apparatus of claim 5 in which at least one of the passages in said arm has an opening facing the exterior of the wheel for directing said fluid against the outer surface of the wheel.

7. The apparatus of claim 5 in which said arm biasing means permits deflection of said arm from said first position in either of two opposed directions.

8. The apparatus of claim 7 in which said arm mounting means has a cavity in the shape of a segment of a circle, said biasing means including a pair of compression springs mounted in said cavity, one on each of opposite sides of a portion of the arm extending into said cavity and movable back and forth therein.

* * * * *